L. G. SHARE.
Fifth-Wheels.

No. 207,213. Patented Aug. 20, 1878.

Witnesses:
Jno. D. Patten
H. H. Bliss

Inventor:
Loring G. Share
by H. H. Doubleday
atty

UNITED STATES PATENT OFFICE.

LORING G. SHARE, OF CORRY, PENNSYLVANIA, ASSIGNOR OF ONE-HALF HIS RIGHT TO SAMUEL B. BROOKS, OF SAME PLACE.

IMPROVEMENT IN FIFTH-WHEELS.

Specification forming part of Letters Patent No. 207,213, dated August 20, 1878; application filed April 30, 1878.

*To all whom it may concern:*

Be it known that I, LORING G. SHARE, of Corry, in the county of Erie and State of Pennsylvania, have invented certain new and useful Improvements in Fifth-Wheels; and I do hereby declare that the following is a full, clear, and exact description thereof, which will enable others skilled in the art to which it appertains to make and use the same, reference being had to the accompanying drawings, and to letters of reference marked thereon, which form a part this specification.

My invention consists in a novel, cheap, and durable method of forming and attaching the parts of fifth-wheels for vehicles, so that the wear of the parts can be readily taken up. The general form of the wheel is similar to many of those in use, being constructed of an upper and a lower half or segment, which correspond to and bear against each other, each half or segment being provided with cross plates or bars for the usual purposes.

Figure 1:
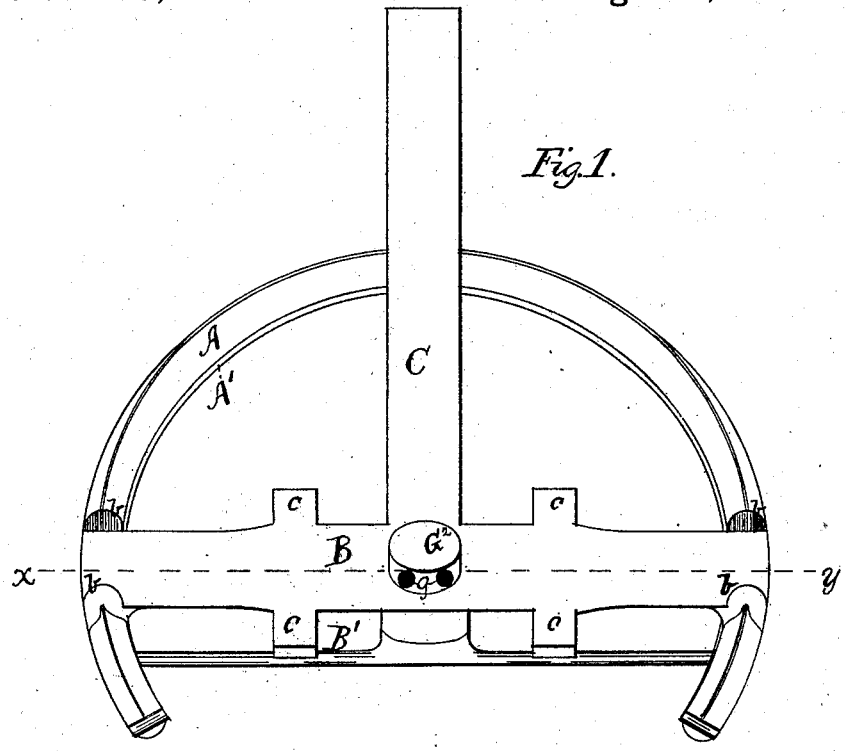
Figure 2:
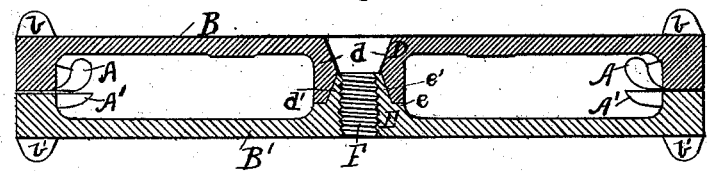
Figure 3:
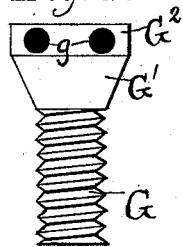

Figure 1 is a perspective view of my improved fifth-wheel. Fig. 2 is a vertical section taken on line $x\,y$ of Fig. 1, the bolt being detached. Fig. 3 shows the bolt for fastening together the parts of the wheel.

In the drawings, A represents the upper half or segment of the wheel, and A' the lower. B represents the cross plate or bar which is attached to or formed with the upper segment, A, and B' the cross-plate attached to the lower segment, A.

$b\,b$ are raised flanges at the ends of cross-plate B, so constructed as to form sockets to receive and hold the head-block or spring of the vehicle. $b'\,b'$ are corresponding flanges, by which to attach the fifth-wheel to the axle.

At $c\,c$ ears or lugs may be formed upon the sides of cross-plate B, through which pass bolts or clips for holding the head block or spring in position.

C is a horizontal bar formed with the segment A and cross-plate B at right angles to the latter, and to it the perch may be attached.

The cross-plate B is constructed with a boss or hub, D, upon its lower side, in which are formed an upward-flaring cone-shaped seat, $d$, and a downward flaring cone-shaped seat $d'$, as shown in Fig. 2. The cross-plate B' is constructed with a boss or hub, E, on its upper side, which is so formed as to have a horizontal shoulder, $e$, and a second hub, $e'$, which is conical in shape, and which is seated in the conical recess or seat $d'$. F is a central screw-threaded aperture through the hub E $e'$ for the reception of the bolt.

It will be seen that by making the seat $d'$ and the head $e'$ conical I insure that there shall not be any of that lateral play of the parts of the wheel relative to each other which exists necessarily in those constructions in wbcih the pivot and its seat are cylindrical.

When the pivotal surfaces are conical, as shown, they cannot wear away so much as to no longer be in contact all around, as whatever wear may occur will be compensated for by the settling down of the upper segment; and it will be also seen that the other wearing-surfaces of the wheel will tend to wear away faster than the conical pivot, as they are farther from the center of rotation, and hence the pivot and its seat will always be in close contact.

In Fig. 3 I have shown my improved bolt for fastening the parts together. It consists of a screw-threaded shank, G, a taper or conical part, $G^1$, and a cylindrical part, $G^2$, which latter has holes $g$ for the insertion of a key or wrench. The threaded portion G engages with the threaded aperture F in hub E $e'$, and the taper part $G^1$ is seated in the conical recess or seat $d$.

What I claim is—

In combination with the hub D, recessed as described, and the screw-threaded hub E $e'$, the bolt G $G^1$ $G^2$, substantially as set forth.

In testimony that I claim the foregoing as my own I affix my signature in presence of two witnesses.

LORING G. SHARE.

Witnesses:
S. B. BROOKS,
H. H. DOUBLEDAY.

This is to certify that the annexed Letters Patent No. 207,213, granted August 20, 1878, for Improvement in Fifth-Wheels, have been corrected for the purpose of remedying a clerical error by erasing the name "Share" of the inventor and patentee wherever it occurs throughout said Letters and the accompanying drawing and specification, and in lieu thereof inserting the name "Shave," to agree with the records on file in this Office.

October 7, 1878.